United States Patent
Kokko et al.

(10) Patent No.: US 8,476,383 B2
(45) Date of Patent: Jul. 2, 2013

(54) PROCESS FOR PRODUCING POLYOLEFINS

(75) Inventors: Tapio Kokko, Porvoo (FI); Erno Elovainio, Helsinki (FI); Jouni Kivela, Helsinki (FI); Klaus Nyfors, Porvoo (FI); Kai Hagane, Langesund (NO)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/388,490

(22) PCT Filed: Nov. 3, 2010

(86) PCT No.: PCT/EP2010/006703
§ 371 (c)(1),
(2), (4) Date: Mar. 22, 2012

(87) PCT Pub. No.: WO2011/066892
PCT Pub. Date: Jun. 9, 2011

(65) Prior Publication Data
US 2012/0178887 A1    Jul. 12, 2012

(30) Foreign Application Priority Data
Dec. 2, 2009    (EP) .................................... 09177704

(51) Int. Cl.
*C08F 2/00*    (2006.01)
*C08F 4/00*    (2006.01)
*C08F 210/00*    (2006.01)
*B01J 8/18*    (2006.01)

(52) U.S. Cl.
USPC ................ 526/72; 526/90; 526/348; 422/139

(58) Field of Classification Search
USPC .................. 526/72, 90, 348; 422/139
See application file for complete search history.

(56) References Cited

U.S. PATENT DOCUMENTS

| | | | |
|---|---|---|---|
| 4,543,399 A | 9/1985 | Jenkins, III et al. | |
| 4,621,952 A | 11/1986 | Aronson | |

FOREIGN PATENT DOCUMENTS

| | | |
|---|---|---|
| EP | 0 022 376 | 1/1981 |
| EP | 0 099 774 | 2/1984 |
| EP | 0 188 125 | 5/1990 |
| EP | 0 491 566 | 6/1992 |
| EP | 0 517 183 | 12/1992 |
| EP | 0 560 312 | 9/1993 |
| EP | 0 560 312 A1 * | 9/1993 |
| EP | 0 586 390 | 5/1997 |
| EP | 0 810 235 | 12/1997 |
| EP | 0 591 224 | 2/1998 |
| EP | 0 926 165 | 6/1999 |
| EP | 0 830 892 | 9/2001 |
| EP | 0 956 307 | 5/2002 |

(Continued)

OTHER PUBLICATIONS

International Search Report mailed Mar. 1, 2011 for International application No. PCT/EP2010/006703.

(Continued)

*Primary Examiner* — William Cheung
(74) *Attorney, Agent, or Firm* — Fay Sharpe LLP

(57) ABSTRACT

The present invention deals with a process of producing a polymer of at least one olefin in two consecutive reactors in gas phase in the presence of an olefin polymerization catalyst where an olefin is polymerized in a first polymerization reactor in the presence of an olefin polymerization catalyst and a first reaction gas mixture to form a fluidized bed comprising an olefin polymer and said first reaction gas mixture.

15 Claims, 2 Drawing Sheets

FOREIGN PATENT DOCUMENTS

| | | |
|---|---|---|
| EP | 0 880 534 | 12/2003 |
| EP | 0 887 380 | 2/2004 |
| EP | 1 159 305 | 4/2004 |
| EP | 1 026 184 | 5/2004 |
| EP | 0 887 379 | 12/2004 |
| EP | 1 114 072 | 12/2004 |
| EP | 0 887 381 | 11/2005 |
| GB | 1 532 332 | 11/1978 |
| WO | WO 92/12182 | 7/1992 |
| WO | WO 95/35323 | 12/1995 |
| WO | WO 96/18662 | 6/1996 |
| WO | WO 99/51646 | 10/1999 |
| WO | WO 00/42077 | 7/2000 |
| WO | WO 01/55230 | 8/2001 |
| WO | WO 03/000744 | 1/2003 |
| WO | WO 03/000757 | 1/2003 |
| WO | WO 03/010208 | 2/2003 |
| WO | WO 03/037941 | 5/2003 |
| WO | WO 03/106510 | 12/2003 |
| WO | WO 04/000899 | 12/2003 |
| WO | WO 2004/029112 | 4/2004 |
| WO | WO 2004/039847 | 5/2004 |
| WO | WO 2004/085499 | 10/2004 |

OTHER PUBLICATIONS

Written Opinion mailed Mar. 1, 2011 for International application No. PCT/EP2010/006703.

Response to Written Opinion mailed Aug. 22, 2011 for International application No. PCT/EP2010/006703.

International Preliminary Report on Patentability completed Nov. 24, 2011 for International application No. PCT/EP2010/006703.

Perry, Robert H., "*Perry's Chemical Engineers' Handbook*", Seventh Edition, Single-Stage Equilibrium-Flash Calculations, 13-25, 1997, ISBN 0-07-049841-5.

Fukui, et al., "*LCM Continuous Mixer/Gear Pump System for Polyolefin Resins*", Society of Plastic Engineers, Polyolefins VII International Conference, Feb. 1991.

* cited by examiner

PROCESS FOR PRODUCING POLYOLEFINS

This application is a U.S. national stage application of International stage application number PCT/EP10/06703, filed Nov. 3, 2010, which claims priority of European Patent application nos. 09177704.5, filed Dec. 2, 2009.

FIELD OF THE INVENTION

The present invention is directed to a process of producing olefin polymers in the presence of an olefin polymerisation catalyst. More specifically, the present invention is directed to a process of polymerising at least one olefin in gas phase in at least two polymerisation stages.

DESCRIPTION OF RELATED ART

WO-A-2004/039847 discloses a process where ethylene was polymerised in a loop reactor followed by the polymerisation in a gas phase reactor. The polymer slurry was directed from the loop reactor into a high pressure flash and from the flash into a gas exchange zone to eliminate the carry-over of the reaction gas from the loop reactor into the gas phase reactor.

WO-A-00/42077 discloses a process where ethylene was polymerised in a loop reactor followed by the polymerisation in a gas phase reactor. The polymer slurry was directed into a liquid-filled column to eliminate the carry-over of the reactants from the loop reactor into the gas phase reactor.

SUMMARY OF THE INVENTION

The aim of the invention is to provide a process which is capable of producing multimodal olefin polymers. Thus, the process of the invention is capable of producing polymer compositions comprising at least two components having widely differing molecular weights and/or contents of comonomer. Further, the present invention provides a simple and economical process for transferring the polymer from one polymerisation reactor into another. Especially the present invention provides a process with a significantly lower investment cost and operating cost than prior art processes.

The present invention provides a process of producing a polymer of at least one olefin in two consecutive reactors in gas phase in the presence of an olefin polymerisation catalyst comprising the steps of:
polymerising an olefin in a first polymerization reactor in the presence of an olefin polymerisation catalyst and a first reaction gas mixture to form a fluidized bed comprising an olefin polymer and said first reaction gas mixture;
continuously or intermittently withdrawing said first reaction gas mixture together with the said olefin polymer comprising said olefin polymerisation catalyst dispersed therein from the first polymerisation reactor to form a first product stream;
directing said first product stream into a separation vessel to form a bed of polymer in said separation vessel;
withdrawing a portion of said first reaction gas mixture from said separation vessel and returning it into said first polymerization reactor;
continuously or intermittently withdrawing said olefin polymer from said separation vessel to form a second product stream; and
directing said second product stream into a second polymerization reactor, wherein said separation vessel operates essentially at the same pressure as the pressure in said first reaction stage at the point from where said first product stream is withdrawn and that said portion of the first reaction gas mixture is returned into the first polymerization stage to a point where the pressure is lower than in said separation vessel.

DETAILED DESCRIPTION OF THE INVENTION

The present invention is useful in the polymerisation of olefins in at least two cascaded reactors. Especially the present invention can be used when polymerising ethylene, propylene, 1-butene, 1-hexene, 4-methyl-1-pentene or 1-octene or their mixtures. In particular the invention is useful in the production of homo- or copolymers of ethylene or propylene, optionally with higher olefins or other comonomers.

In an especially preferred embodiment the present invention is used in polymerising ethylene or propylene, optionally with comonomers, in a process comprising at least two cascaded fluidized bed gas phase reactors in the presence of an olefin polymerisation catalyst.

Polymerisation Process

Figure 1:
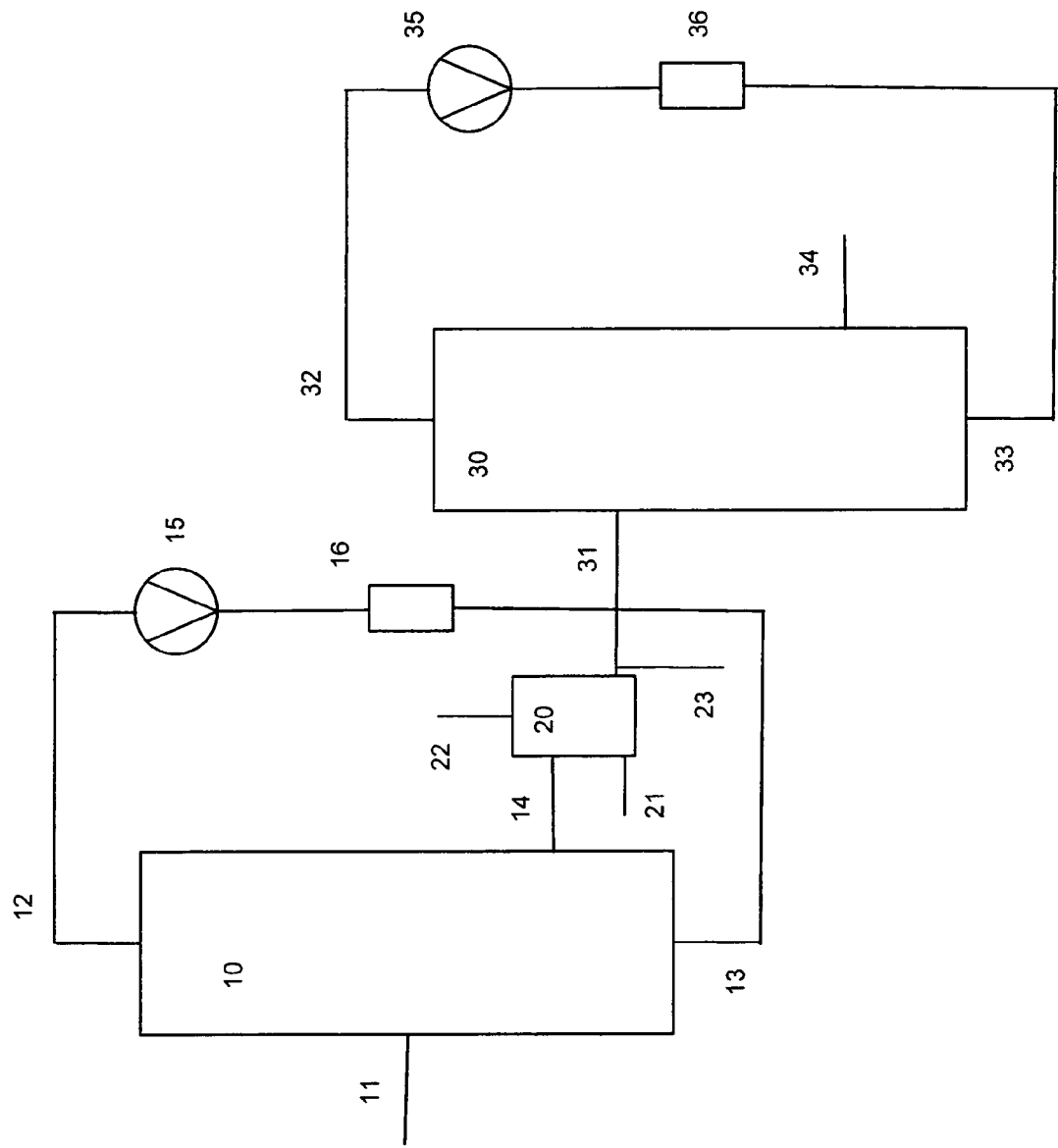
FIG. 1 shows a typical example of the process according to the present invention.

A typical process according to the present invention is shown in FIG. 1 where olefins are polymerised in two fluidized bed gas phase reactors, 10 and 30. The catalyst, which may be dispersed within polymer particles from a prior polymerization stage, is introduced into the first gas phase reactor below the level of the fluidized bed but above the base of the fluidized bed via the conduit 11. The unreacted gas is collected from the top of the reactor via the conduit 12, compressed in a compressor 15 and cooled in a heat exchanger 16. The cooled and compressed gas is reintroduced into the reactor below the base of the fluidized bed via the conduit 13. The polymer, together with some accompanying gas, is withdrawn from the reactor via the conduit 14 and directed into a separation vessel 20.

Into the separation vessel 20 gas is fed via the conduit 21. The gas flows upwards in the separation vessel 20 and helps to remove the gas entering the separation vessel 20 together with the polymer from the reactor 10 via the conduit 14. The gas is withdrawn from the separation vessel 20 via the conduit 22 and may be returned into the reactor 10 or into the circulation gas line 12 before the compressor 15. The polymer, which now is in mixture with the gas entering from the conduit 21, leaves the separation vessel 20 via the conduit 31. Via conduit 23 additional gas may be introduced to facilitate pneumatic transport of the polymer from the separation vessel 20 to the reactor 30.

The polymerisation is then continued in the reactor 30 in a similar fashion as was discussed above for reactor 10.

If the process includes more than two polymerization stages then the present invention may be used in all the steps where the polymer is transferred from one gas phase polymerization stage to another.

Catalyst

Any particulate polymerisation catalyst can be used in the process of the present invention. Thus, the catalyst may be of Ziegler-Natta type, or it may be a metallocene catalyst or it may be a late transition metal catalyst or it may be a chromium containing catalyst. Preferably the catalyst is in particulate form so that the polymer produced in each polymerisation stage is formed on the same particles.

A Ziegler-Natta catalyst preferably contains a solid transition metal component and a coactivator. The transition metal component comprises a compound of an element of groups 4 to 7 of the Periodical System of Elements (IUPAC), preferably a halide of said element. Suitable examples of such catalysts are given in the patent literature, for example in WO-A-95/35323, WO-A-01/55230, EP-A-810235, WO-A-99/51646, EP-A-491566, EP-A-591224, EP-A-586390, EP-A-926165, EP-A-1114072, WO-A-03/000757, WO-A-2004/029112 and WO-A-03/106510.

In addition the Ziegler-Natta catalyst comprises an activator. The activator is a compound which is capable of activating the transition metal component. Useful activators are, among others, aluminium alkyls and aluminium alkoxy compounds. Especially preferred activators are aluminium alkyls, in particular aluminium trialkyls, such as trimethyl aluminium, triethyl aluminium and tri-isobutyl aluminium. The activator is typically used in excess to the transition metal component. For instance, when an aluminium alkyl is used as an activator, the molar ratio of the aluminium in the activator to the transition metal in the transition metal component is from 1 to 1000 mol/mol, preferably from 2 to 500 mol/mol and in particular from 5 to 200 mol/mol.

It is also possible to use in combination with the above-mentioned two components different co-activators, modifiers and the like. Thus, two or more alkyl aluminium compounds may be used, or the catalyst components may be combined with different types of ethers, esters, silicon ethers and the like to modify the activity and/or the selectivity of the catalyst, as is known in the art.

Suitable metallocene catalysts are compounds of group 4 to 7 elements of Periodic Table of Elements containing cyclopentadienyl, indenyl and/or fluorenyl type of ligands. Examples of such compounds are given EP-A-880534, EP-A-956307, WO-A-03/000744, WO-A-03/010208 and WO-A-2004/085499.

Also combined catalysts including two or more types of different catalysts may be used. Thus, the catalyst may include two metallocenes, or a Ziegler-Natta component and a metallocene component and the like.

Suitable activators for metallocene catalysts are aluminium oxanes, such as methylaluminiumoxane (MAO), tetra-isobutylaluminiumoxane (TIBAO) and hexa-isobutylaluminiumoxane. Also boron compounds may be used as activators, such as trisperfluorophenylboron, tris(3,5-di(fluoromethyl)phenyl)boron, and tris(di-t-butyl methylsilyl)perfluorophenylboron.

Prepolymerisation

In some cases it is preferred that the polymerisation stage is preceded by a prepolymerisation stage. In prepolymerisation a small amount of an olefin, preferably from 0.1 to 500 grams of olefin per one gram catalyst is polymerised. Usually the prepolymerisation takes place at a lower temperature and/or lower monomer concentration than the actual polymerisation. Typically, the prepolymerisation is conducted from −10 to 90° C., preferably from 0 to 80° C. For instance, when propylene is polymerised then it is preferred to conduct the prepolymerization at the low end of the temperature range, i.e., from −10 to 40° C., preferably from 0 to 30° C. On the other hand, in ethylene polymerisation it is usually preferred to use the upper end of the temperature range, such as from 30 to 90° C., preferably from 40 to 80° C. Usually, but not necessarily, the monomer used in the prepolymerisation is the same that is used in the subsequent polymerisation stage(s). It is also possible to feed more than one monomer into the prepolymerisation stage. Descriptions of prepolymerisation can be found in, e.g., WO-A-96/18662, WO-A-03/037941, GB-A-1532332, EP-A-517183, EP-A-560312 and EP-A-99774.

First Polymerisation Stage

In the first polymerisation stage the olefin monomer is polymerised in the presence of an olefin polymerisation catalyst in the first reaction mixture. The polymer produced in the first polymerisation stage may be any olefin homo- or copolymer. The polymerisation takes place in gas phase, preferably in a fluidised bed gas phase reactor.

The temperature in the polymerisation reactor needs to be sufficiently high to reach an acceptable activity of the catalyst. On the other hand, the temperature should not exceed the softening temperature of the polymer. The temperature may be selected from the range of 50 to 110° C., preferably 75 to 105° C. and more preferably 75 to 100° C.

The pressure in the reactor can be selected to fulfil the desired objectives: to reach a desired density of the reaction medium or to reach a suitable monomer concentration. Suitable pressure range in gas phase polymerisation the pressure is from 5 to 50 bar, preferably from 10 to 30 bar.

The first polymerization stage is conducted as a gas phase polymerization. It may be conducted in any reactor known in the art, such as fluidized bed reactor, agitated bed reactor or settled bed reactor.

In an especially preferred embodiment the first polymerisation stage is conducted as a fluidized bed gas phase polymerisation. In that case a gas mixture comprising monomer, and optionally an inert gas, hydrogen and alpha-olefin comonomer is introduced into the lower part of the reactor, preferably at the bottom of the reactor. The catalyst is often introduced into the bed of polymer, where the polymerisation takes place. Again, optionally hydrogen and one or more comonomers are introduced into the reactor to control the MFR and density or crystallinity or comonomer content of the polymer. Typically, the ratio of hydrogen to the monomer in the gas phase is from 0 to 15000 mol/kmol and the ratio of the comonomer to the monomer is from 0 to 1000 mol/kmol, preferably from 0 to 500 mol/kmol. The gas flows upwards through the bed of growing polymer particles. The unreacted gas is withdrawn from the top of the reactor, compressed, cooled and redirected to the lower part of the reactor.

As the person skilled in the art knows the pressure at a specific point within a fluidized bed depends on the pressure of the gas above the bed on one hand and the height of the bed above said point on the other hand. Thus, the pressure at a point located near the bottom of the bed is higher than the pressure at a point located near the surface of the bed. Generally, the pressure at a given point within the bed can be calculated from the equation:

$$p_x = p_0 + \rho \cdot g \cdot h_x$$

In the equation $p_x$ is the pressure at the level x in the fluidized bed, $p_0$ is the pressure of the gas above the bed, $\rho$ is the density of the fluidized bed, g is the gravitational constant and $h_x$ is the height of the bed above the level x (i.e., the distance from the level x to the top of the bed).

The polymer is withdrawn from the first polymerisation stage either continuously or intermittently. By continuous withdrawal it is meant that the polymer flow out of the reactor is continuous, i.e. that there is always an open connection from the reactor to the connected equipment through which polymer can flow out of the reactor. The valve is at least partially open and the position of the valve is adjusted based on a desired control strategy. This results in an uninterrupted flow of particulate polymer from the reactor into the separation vessel. Continuous withdrawal of polymer is described, among others, in EP-A-1159305.

On the other hand by intermittent, or discontinuous, withdrawal it is meant that small batches of the polymer are withdrawn from the reactor at distinct times; the valves in the polymer withdrawal line are thus fully open when a batch is withdrawn from the reactor and fully closed otherwise. Such outlet is disclosed, among other, in U.S. Pat. No. 4,621,952, EP-A-188125, U.S. Pat. No. 4,543,399 and EP-A-830892.

It is within the scope of the invention that said first polymerisation stage would be preceded by further upstream polymerisation stages. These preceding stages can be conducted in any manner known in the art. For instance, the first polymerisation stage conducted in a fluidized bed gas phase reactor can be preceded by a prior polymerisation stage conducted as a slurry polymerisation stage in a loop reactor.

Second Polymerisation Stage

In the second polymerisation stage a polymer is produced that is preferably different from the polymer produced in the first polymerisation stage with respect of at least one feature. The polymerisation in the second polymerisation stage takes place in the presence of an olefin polymerisation catalyst in the second reaction mixture. The composition of the second reaction mixture therefore preferably differs in terms of at least one component from the composition of the first reaction mixture.

The second polymerisation stage may be conducted in conditions that are similar to what was disclosed for the first polymerisation stage. However, as it was discussed above, the second reaction mixture preferably differs with respect to at least one component from the first reaction mixture. Thus, for instance, the first reaction mixture may be rich in hydrogen whereas the second reaction mixture contains only a minor amount of hydrogen. Alternatively, the first reaction mixture may contain a high amount of comonomer whereas the second reaction mixture contains no, or only a very minute amount of, comonomer.

It is known in the art to polymerise in at least two polymerisation stages to produce bimodal polyolefins, such as bimodal polyethylene, as disclosed in WO-A-92/12182, EP-A-22376 and WO-A-2004/039847, or bimodal PP as disclosed in EP-A-887381. Furthermore, it is known in the art to produce heterophasic copolymers of propylene, as disclosed in EP-A-1026184.

The method of the invention is especially useful in the polymerisation of propylene in transferring the polymer from one gas phase reactor into another.

It is within the scope of the invention that said second polymerisation stage would be succeeded by further downstream polymerisation stages. These succeeding stages can be conducted in any manner known in the art.

Separation Vessel

The polymer withdrawn from the first reactor was traditionally directed to a pressure reduction stage, where a part or all of the first reaction mixture was removed from the polymer. While it would be beneficial to remove practically all the first reaction mixture to prevent a carry-over of the components of the first reaction mixture into the second polymerisation stage, this is not desired from the economical point of view. In such a case it would be necessary to reduce the pressure near the atmospheric pressure and thereafter to compress the first reaction mixture that was removed from the polymer above the pressure of the first polymerisation stage so that it could be recycled into the first polymerisation stage, possibly after purification.

Therefore, from the economical point of view it is beneficial to reduce the pressure so that it is lower than the pressure in the first polymerisation stage but higher than the pressure of the second polymerisation stage. However, even in such a case the recycle gas could not be recycled directly back to the polymerization process.

According to the present invention the pressure of the mixture recovered from the first polymerisation stage is taken into a separation stage operating essentially at the same pressure as the polymer outlet in said first polymerisation stage. Thus, the pressure within the separation vessel is within 10%, preferably within 5% of the pressure in the first polymerization stage at the level from where the first reaction mixture is withdrawn. The first reaction mixture, including a first gas mixture together with the polymer, is directed to a separation vessel where a bed of polymer is formed. The polymer and the first gas mixture enter the separation vessel from the top and the polymer is withdrawn and directed to the second polymerisation stage from the bottom part of the vessel. The excess gas is withdrawn from the upper part of the vessel and preferably from above the level of the polymer bed. The thus withdrawn gas is recycled into the first polymerisation stage to a place where the pressure is lower than in the separation vessel. For instance, the gas may be returned to the polymer bed into a location which is higher than the point where the polymer is withdrawn from the reactor. Preferably the gas is returned above the level of the polymer bed within said first polymerization stage. However, it is also possible to recycle the gas into the gas circulation line to the suction side of the compressor.

The pressure in the separation stage is higher than the pressure in the second polymerization stage. Thus, the pressure may be from about 0.1 to 10 bar higher, preferably from 0.2 to 5 bar higher than the pressure in the second polymerization stage. Moreover, preferably the pressure is such that said first gas mixture remains substantially in gas phase or vapour phase.

The polymer is withdrawn from the bottom section of the separation vessel continuously or intermittently. By continuous withdrawal it is meant that the polymer flow out of the separation vessel is continuous, i.e. that there is always an open connection from the separation vessel to the connected equipment through which polymer can flow out of the reactor. The valve is at least partially open and the position of the valve is adjusted based on a desired control strategy. This results in an uninterrupted flow of particulate polymer from the separation vessel into the subsequent polymerization reactor.

According to a preferred embodiment of the present invention a second gas is introduced into the bottom part of the separation vessel. By bottom part is here meant the lower half of the separation vessel. Thus, when denoting the total height of the separation vessel by I, then the second gas is introduced into the level y from the bottom of the separation vessel, where $$y \leq \frac{l}{2},$$

and preferably $$y \leq \frac{l}{3}.$$

In an especially preferred embodiment of the invention the amount of the second gas introduced into the bottom part of the separation vessel should be such that the superficial gas velocity flowing upwards in the settled polymer bed is lower than the minimum fluidising velocity of the polymer particles forming said bed. If this were not the case the bed would not remain settled. On the other hand, the pressure at the bottom of the settled bed should be higher than the pressure within the second polymerisation stage. Otherwise it would not be possible to feed the polymer into the second polymerisation stage. The second gas flows counter-currently with the polymer and replaces the first reaction mixture from the polymer bed.

The second gas should not include components which are poisonous towards the polymerisation catalyst. Such components are, as it is known in the art, among others, oxygen-containing compounds such as water, oxygen, carbon dioxide and carbon monoxide, and sulphur-containing compounds such as mercaptans and carbonyl sulphide.

Ideally, the second gas would consist of the same compounds in the same proportion as the second reaction mixture present in the second polymerisation stage. However, it is possible that the second gas contains only one or some of these compounds. It is also possible that the second gas consists of components that are inert and have no effect on the polymerisation reaction in the second polymerisation stage.

Thus, according to one preferred embodiment the second gas is monomer taken either from the fresh monomer feed into the process or from the monomer recovery stream. This is an especially preferred embodiment when the monomer is propylene. When the monomer is ethylene it would be advantageous to dilute the monomer with an inert component to avoid vigorous polymerisation in the settled bed.

The gas withdrawn from the top of the separation vessel is returned to the polymerisation process, preferably continuously. In an especially preferred embodiment, where the first polymerisation stage is conducted in a fluidised bed gas phase reactor, the gas is returned into the first gas phase reactor at a place where the pressure is lower than the pressure in the flash vessel. For example, the gas can be returned into the top of the first gas phase reactor at a point above the level of the fluidised bed. Alternatively, the gas can be returned into the circulation gas line in the suction side of the circulation gas compressor.

The second gas is preferably introduced in an amount which is about the same as or higher than the flow of the first reaction gas mixture accompanying the polymer.

Thus, the ratio of the flow rate of the second gas to the flow rate of the first gas mixture in volumetric basis is preferably from 0.5 to 2, more preferably from 0.95 to 1.8, even more preferably from 1.0 to 1.5 and in particular from 1.0 to 1.3. For instance, a ratio of about 1.1 has been found to give good results.

Suitable residence time of the polymer in the separation vessel is from about 30 seconds to 5 minutes. Longer residence times typically result in a better displacement of the gas but also have the draw-back that larger and more expensive equipment is needed. However, the residence time should not be too short because otherwise sufficient replacement of the gas is not achieved. There is no significant advantage in residence times of more than 5 minutes and good results have been obtained when the residence time has been from 45 seconds to 3 minutes.

The temperature within the separation vessel should be selected so that on one hand it is lower than the softening temperature of the polymer and on the other hand it is sufficiently high to maintain the gas mixture substantially in vapour phase. It is especially advantageous if the temperature is the same as or near the temperature in the first reactor because then no heating or cooling of the polymer is needed. When the present invention is used in the polymerisation of propylene good results have been obtained when the temperature is from 70 to 120° C., preferably from 80 to 100° C. and especially preferably the same as the temperature in the first reactor.

It is possible, if desired, to feed the second gas wholly or partly in liquid state, for instance to control the temperature in the separation vessel. The liquid part of the second gas then evaporates within said separation vessel and assists in cooling the polymer bed.

Figure 2:
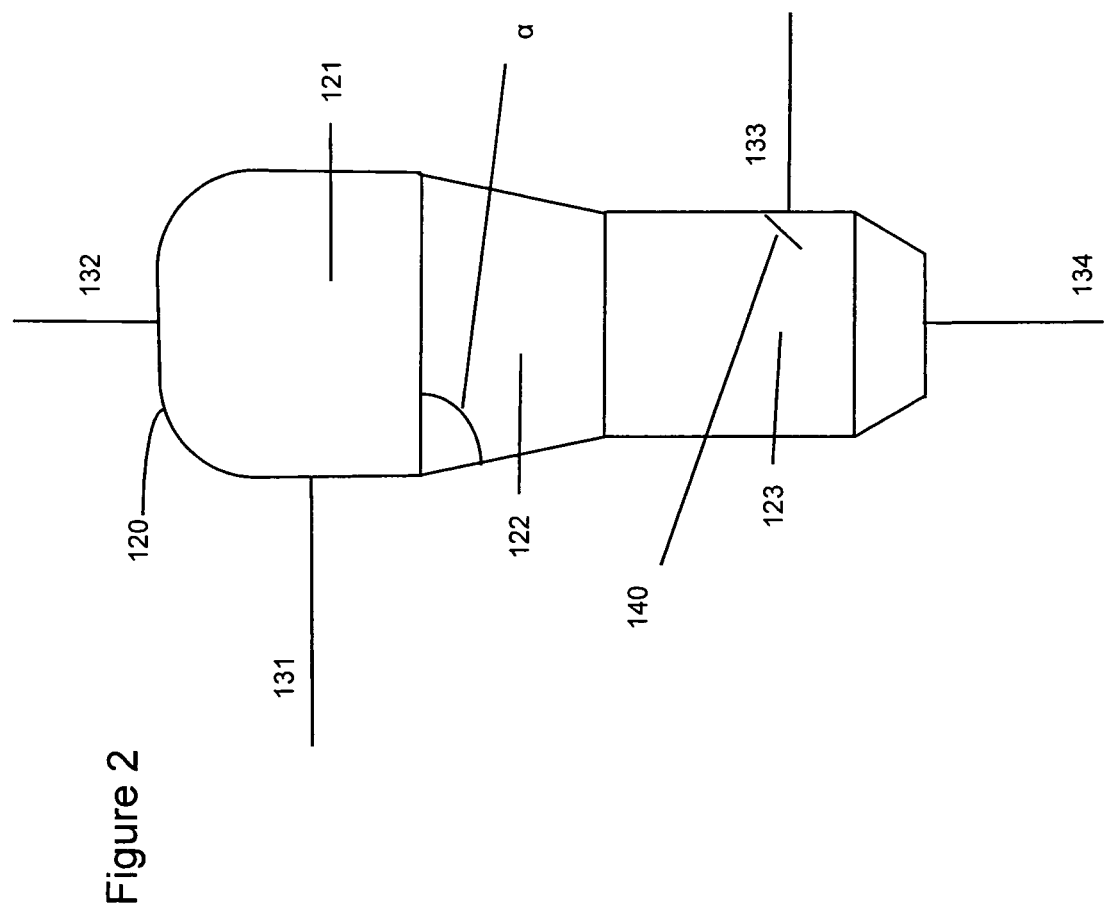
FIG. 2 shows the details of the separation vessel where the first reaction mixture is replaced by a second mixture.

For example, the removal of the first mixture can be conducted in an apparatus according to FIG. 2. The vessel 120 has three zones. The polymer is introduced into and the gas is withdrawn from a separation zone 121. Below that there is a hold-up zone 122 containing the settled bed of the polymer. At the bottom of the vessel 120 there is a displacement zone 123 from where the polymer is withdrawn and where the second gas may be introduced.

The polymer, still containing residual gas from a prior reaction zone, enters the vessel 120 via a conduit 131. Preferably the conduit 131 is located above the level of the polymer bed. The gas is withdrawn via conduit 132. The conduit 132 may be equipped with a control valve, for instance, to maintain a predetermined pressure within the vessel 120. Also the conduit 131 may contain a control valve for controlling the polymer withdrawal rate from the reactor.

The polymer flows downwards in the vessel 120 preferably in a substantially plug flow mode. The polymer is withdrawn from the displacement zone 123 via conduit 134. Gas is introduced into the displacement zone via conduit 133. It is often advantageous to use flow diverters 140 at the gas entry points to direct the gas flow to the desired direction and to avoid by-pass. Such flow diverters can be, for instance, metal plates which are fastened to the wall of the vessel 120. In an embodiment according to FIG. 2 they may form an angle of from 5 to 50 degrees with the wall to direct the gas flow downwards. Thereby a good dispersion between the gas and solid polymer particles is obtained. A carrier gas may be additionally introduced into the conduit 134 to convey the powder pneumatically into a subsequent process stage. The conduit 134 may contain a control valve for controlling the flow rate of the polymer from the vessel 120.

The hold-up zone 122 connects the separation zone 121 to the displacement zone 123. As the separation zone 121 typically has a larger diameter than the displacement zone, so that for instance the diameter of the separation zone 121 is from about 1.2 to 5, preferably from 1.5 to 4 times the diameter of the displacement zone 123, the hold-up zone 122 has typically the shape of a truncated cone. The angle $\alpha$ then may be selected so that the polymer may freely flow within the vessel. The angle $\alpha$ may thus range from less than 90 degrees to about 50 degrees, such as from 85 to 55 degrees or from 80 to 60 degrees.

In addition the vessel 120 and the connected piping may include any instrumentation known in the art for measuring and controlling desired properties, such as the bed level in the vessel 120, the gas flow rates into and out of vessel 120 and so on. Such instrumentation as well as the design of suitable control strategies is well known in the art.

Extrusion

After the polymer is collected from the reactor and the hydrocarbon residues are removed therefrom, the polymer is compounded and extruded to pellets. In this process step, any extruder known in the art may be used. It is preferred, however, to use a twin screw extruder. It may be of a co-rotating type, such as those produced by Werner & Pfleiderer having a designation ZSK, e.g. ZSK 90 having a 90 mm screw diameter. Alternatively, it may be of a counter-rotating type, such as those produced by Japan Steel Works, having a designation JSW CIM-P, e.g. CIM90P, having a 90 mm screw diameter, or LCM continuous mixer by Kobe Steel, such as LCM500H, or Farrel continuous mixer (FCM) by Farrel.

The extruder may contain one or more gear pumps or throttle valves or both. This equipment can be used to improve the homogeneity of the polymer composition or to increase the capacity of the extruder. Such a solution is disclosed, among others, by T. Fukui and R. Minato: "LCM Continuous Mixer/Gear Pump System for Polyolefin Resins", Society of Plastics Engineers Polyolefins VII International Conference, Feb. 24-27, 1991, Wyndham Greenspoint Hotel, Houston, Tex.

Before the extrusion the polymer may be mixed with the desired additives depending on the planned use of the polymer.

EXAMPLES

Example 1

Propylene was polymerised as follows.

Into a prepolymerisation reactor operated at 20° C. and a pressure of about 56 bar was fed a titanium containing polymerisation catalyst solid component prepared according to Test 3 of EP-A-591224, triethylaluminium cocatalyst and cyclohexylmethyldimethoxysilane so that the ratio of TEA to titanium was about 100 mol/mol and the ratio of CHMDMS to TEA was about 10 mol/mol. In addition, propylene was fed so that the polymer production rate was about 300 kg/h.

The slurry from the prepolymerisation reactor was then continuously directed into a loop reactor, where additional propylene and hydrogen were added. The temperature was 70° C., the pressure about 55 bar and the residence time was about 40 minutes. The polymer was withdrawn from the reactor at a rate of 25 t/h.

The slurry was continuously withdrawn from the loop reactor and directed into a gas phase fluidized bed reactor operated at about 22 bar pressure above the bed and 85° C. temperature in a manner disclosed in EP-A-887381. Additional propylene and hydrogen were fed into the first gas phase reactor so that the polymer production rate in the reactor was 21.2 t/h and thus in total 46.2 t/h of polypropylene was withdrawn from the gas phase reactor. The ratio of hydrogen to propylene in the reactor was 600 mol/kmol. The height of the fluidized bed was about 20 m.

The polymer (46.2 t/h) was continuously withdrawn from the gas phase reactor at a level of about 4 m above the fluidization grid and directed into a separation vessel operated at 22 bar and 80° C. Together with the polymer 6.2 t/h of the reactor gas was removed.

The vessel geometry was essentially similar to that of FIG. 2. The height of the displacement zone was 1 meter, the conical section had a height of 1.3 meters and the cylindrical top section had a height of 1.5 meters. The diameters of the lower and upper cylindrical sections were 500 mm and 1300 mm, respectively. The polymer formed a settled bed in which the residence time of the polymer was 90 seconds. Into the displacement zone was introduced fresh propylene at a rate of 6.8 t/h and the gas collected from the top of the vessel was returned into the top of the first gas phase reactor, to a level above the fluidised bed.

The polymer was continuously removed from the bottom of the vessel via 75 mm pipe and directed into a second gas phase reactor by transferring it pneumatically.

The transport gas had the same composition as the fluidisation gas used in the second gas phase reactor. The second gas phase reactor was operated at 70° C. and 20 bar. Into the reactor were also additional propylene, hydrogen and ethylene introduced. The ratio of ethylene to propylene was about 400 mol/kmol, and the ratio of hydrogen to propylene was about 10 mol/kmol. The polymer production rate was 13.8 t/h and thus in total 60 t/h of propylene copolymer was withdrawn from the second gas phase reactor.

As the example above shows the reactors could be operated at different conditions and the hydrogen to ethylene ratio in the second reactor could be maintained at a very low level even though a high ratio was present in the first reactor.

The invention claimed is:

1. A process of producing a polymer of at least one olefin in two consecutive reactors in gas phase in the presence of an olefin polymerisation catalyst comprising the steps of:
    polymerising an olefin in a first polymerization reactor in the presence of an olefin polymerisation catalyst and a first reaction gas mixture to form a fluidized bed comprising an olefin polymer and said first reaction gas mixture;
    continuously or intermittently withdrawing said first reaction gas mixture together with said olefin polymer comprising said olefin polymerisation catalyst dispersed therein from the first polymerisation reactor to form a first product stream;
    directing said first product stream into a separation vessel to form a bed of olefin polymer in said separation vessel;
    withdrawing a stream of said first reaction gas mixture from said separation vessel and returning it into said first polymerization reactor;
    continuously or intermittently withdrawing said olefin polymer from said separation vessel to form a second product stream; and
    directing said second product stream into a second polymerization reactor, characterised in that the pressure in said separation vessel is within 5% of the pressure in said first reaction stage at the point from where said first product stream is withdrawn and that said stream of the first reaction gas mixture is returned into said first polymerization stage to a point where the pressure is lower than in said separation vessel.

2. The process according to claim 1, wherein said stream of said first reaction gas mixture is withdrawn from above the level of said olefin polymer bed in said separation vessel.

3. The process according to claim 1, wherein said first product stream is withdrawn continuously from said first polymerization reactor.

4. The process according to claim 1 wherein the olefin polymer forms a settled downward moving bed of olefin polymer in said separation vessel.

5. The process according to claim 1 wherein said second product stream is withdrawn continuously from said separation vessel.

6. The process according to claim 1 wherein said second polymerization reactor contains a second reaction gas mixture which differs in terms of at least one component from the composition of said first reaction gas mixture characterized in that a second gas which is different from said first reaction gas mixture is introduced into said separation vessel.

7. The process according to claim 6 wherein said second gas is introduced into the lower part of said separation vessel.

8. The process according to claim 6 characterized in that the ratio of the volumetric flow rate of said second gas to the volumetric flow rate of said first reaction gas mixture is from 0.5 to 2.

9. The process according to claim 6, characterized in that the average residence time of the olefin polymer in the separation vessel is from 30 seconds to 5 minutes.

10. The process according to claim 6 wherein at least a part of said second gas is introduced in liquid form.

11. The process according to claim 6 wherein said second gas has the same composition as said second gas mixture.

12. The process according to claim 6 wherein said second gas is propylene.

13. The process according to claim 1 wherein said at least one olefin monomer is selected from the group consisting of ethylene, propylene, 1-butene, 1-hexene, 4-methyl-1-pentene or 1-octene, 1-decene and their mixtures.

14. The process according to claim 13 wherein said at least one olefin monomer is selected from the group consisting of ethylene, propylene and their mixtures.

15. The process according to claim 7 wherein said second gas is introduced into the lower part of said separation vessel so that $y \leq l/2$, wherein l is the height of said separation vessel and y is the distance from bottom of the separation vessel to the point from which the second gas is introduced into the separation vessel.

\* \* \* \* \*